United States Patent Office 2,711,403
Patented June 21, 1955

2,711,403

ESTERS OF AROMATIC OLEFINIC PHOSPHINIC ACIDS

Alan R. Stiles, Berkeley, and Denham Harman, Orinda, Calif., assignors to Shell Development Company, Emeryville, Calif., a corporation of Delaware No Drawing. Application November 24, 1952, Serial No. 322,355

9 Claims. (Cl. 260—78.5)

This application is a continuation-in-part of our copending application Serial No. 122,152 filed October 18, 1949 now abandoned.

This invention relates to new esters of phosphinic acids, in which both an aromatic radical and an olefinic radical are attached to phosphorus. More particularly the invention provides new polymerizable aromatic organo-phosphorus compounds containing the polymerizable reactive grouping in an open chain of carbon atoms directly linked to phosphorus, and polymers of the new compounds.

It appears that the only polymerizable aromatic organo-phosphorus compounds known prior to our invention were those in which polymerizable reactive groupings were contained in esterifying radicals, e. g., diallyl phenylphosphonate, and the like compounds. The compounds provided by our invention each contain such grouping in an open chain of carbon atoms linked to phosphorus by a C—P bond, a type of bond which has proven to be vastly more stable than a C—O—P bond.

The novel esters of our invention are the esters of phosphinic acids, which esters are represented by the formula

in which Ar represents a member of the class consisting of the phenyl group and the alkyl-substituted phenyl groups, R' represents a lower 2-alkenyl group, and R represents a lower unsubstituted aliphatic hydrocarbon group containing not more than one unsaturated linkage. Examples of the compounds provided by the invention are methyl benzene(2-propene)phosphinate, methallyl benzene(2-propene)phosphinate, decyl benzene(2-methyl-2-propene)phosphinate, isopropyl tertiary-butylbenzene-(2-propene)phosphinate, pentyl benzene(2-butene)phosphinate, methyl p-toluene(2-ethyl-2-propene)phosphinate, 2-ethylhexyl 2,3,5-trimethylbenzene(2-butene)phosphinate, benzyl 3,5-di-t-butylbenzene(2-propene)phosphinate, 3,3,5 - trimethylhexyl 3,5 - diethylbenzene(2 - methyl - 2-propene)phosphinate, isobutyl 3,5-diisopropylbenzene(2-ethyl - 2 - propene)phosphinate, allyl 4-n-butylbenzene(2-methyl-2-propene)phosphinate, hexyl 2,3,5-trimethylbenzene(2-propene)phosphinate, butyl 4-dodecylbenzene(2-propene)phosphinate, and allyl pentemethylbenzene (2-ethyl-4-methyl-2-heptene)phosphinate.

The group represented by Ar thus will be seen to be the phenyl group or a phenyl group having one or more of the hydrogen atoms replaced by alkyl substituents, each of which substituents may contain from one to twelve or more carbon atoms. Although the invention is not limited as to number or length of alkyl groups which may be substituted on the phenyl group represented by Ar, the most desirable compounds of the invention are those in which the phenyl group, represented by Ar, contains from none to three alkyl substituents, each containing from one to four carbon atoms, i. e., the phenyl group and the phenyl group having either one, two, or three substituents selected from the methyl, ethyl, propyl, butyl, secondary butyl, isobutyl, and tertiary butyl groups.

The lower 2-alkenyl group represented by R' may be straight-chain or branched-chain. By the term "lower 2-alkenyl group" reference is made to the allyl group and the allyl groups which are substituted by one or more lower alkyl groups as the only substituents, the lower 2-alkenyl group preferably containing from three to ten carbon atoms. Although the invention is not limited thereto, the most valuable novel monomeric compounds of the invention are those in which the 2-alkenyl group contains the unsubstituted methylidene group ($CH_2=$), as in the allyl group, the methallyl group, etc.

The aliphatic hydrocarbon group represented by R may be saturated, as in the preferred compounds of the invention, or it may contain one unsaturated carbon-to-carbon linkage. By the term "lower unsubstituted aliphatic hydrocarbon group containing not more than one unsaturated linkage," reference thus is made to the lower alkyl groups and to the lower alkenyl groups, such as allyl, methallyl, vinyl, isopropyl, decyl, crotyl, 3-pentenyl, 2-methyl-3-butyn-2-yl, 2-ethylhexyl, and amyl. The aliphatic hydrocarbon group represented by R, being a lower aliphatic hydrocarbon group, will contain from one to about ten carbon atoms.

In addition to their utility as polymerizable intermediates the esters of this invention are of interest for use as additives to lubricants, of the naturally-occurring or petroleum-based variety, as well as of the synthetic type, and for use as flame retardants and as ingredients in plastic or resinous compositions, e. g., as polymerizable plasticizers.

It has been indicated that organo-phosphorus compounds containing a single polymerizable $C=C$ group in an open chain of carbon atoms linked to a phosphorus atom are incapable of homopolymerizing under the usual homopolymerization conditions (see, for example, U. S. 2,439,214). Surprisingly, the esters provided by the present invention readily undergo homopolymerization.

A particularly convenient method of preparing the esters of our invention consists of reacting an ester of an aromatic phosphonous acid with an allyl-type hydrocarbon halide, i. e., beta,gamma-olefinically unsaturated hydrocarbon halide. The reaction proceeds in accordance with the equation

in which Ar, R, and R' are defined as hereinbefore, and X is an atom of halogen, preferably chlorine or bromine. The reaction can be carried out in the manner and under the conditions corresponding to those that are suitable for carrying out the well-known "Arbusov" reaction. In the Arbusov reaction alkyl halides react with trialkyl phosphites to produce, presumably via addition and isomerization, a dialkyl alkane phosphonate in which the alkane residue directly substituted on the phosphorus atom is derived from the alkyl group of the alkyl halide. The Arbusov reaction conveniently may be carried out by heating, in a sealed tube or under reflux, a mixture of the trialkyl phosphite and the alkyl halide at a suitable elevated temperature, e. g., from about 75° C. to about 200° C., and after fractionally distilling the mixture to separate the desired product or to remove the alkyl halide produced by the reaction. If desired the liberated alkyl halide may be continually wtihdrawn from the mixture during the heating period, as by fractional condensation of the vapors.

For the preparation of the preferred compounds of our invention we may employ a beta,gamma-olefinically unsaturated hydrocarbon halide having from three to ten carbon atoms. The halogen preferably is bromine or chlorine, although iodides can also be used. By the term "beta,gamma-olefinically unsaturated hydrocarbon halide" we mean that the hydrocarbon halide has one atom of halogen and that one in the allyl position relative to the olefinic bond, i. e., substituted on a saturated carbon atom which in turn is directly bonded to an olefinically unsaturated carbon atom. Esters of aromatic phosphonous acids which are useful for the preparation of the preferred compounds of the invention are those which contain from one to about ten carbon atoms in each alcohol residue. In other words, each OR in the preceding equation preferably will represent the residue OR of an alcohol ROH containing from one to about ten carbon atoms. The most readily prepared and hence preferred esters of our invention are those in which the group represented by Ar contains from six to about eighteen carbon atoms.

The polymeric compounds provided by our invention are prepared by polymerizing, i. e., by homopolymerizing or by copolymerizing with other polymerizable compounds, the monomeric compounds of our invention. The polymerization can be carried out by known procedures for the polymerization of polymerizable ethylenically unsaturated compounds. The polymerization usually will be carried out by heating the monomer or mixture of monomers which is to be polymerized in the presence of an added material which decomposes to yield free radicals, such as a peroxidic compound. The polymerization can be energized by heating at about the decomposition temperature of the added material, by exposure to actinic light or by equivalent means. The polymerization may be carried out in bulk, in solution, or in disperse phase. Examples of polymerization catalysts which may be used in or for the preparation of the novel polymers include, among others, di-tertiary-butyl peroxide, dibenzoyl peroxide, tertiary-butyl hydroperoxide, 2,2-bis(tertiary-butylperoxy)butane, tertiary-butyl perbenzoate, di-tertiary-butyl diperoxalate, hydrogen peroxide, ozone, diazomethane, and the like.

The esters provided by the present invention can be copolymerized with any compound capable of undergoing free radical-initiated copolymerization reactions. Such compound preferably will contain the vinylidene group ($CH_2=C<$) and may be exemplified by the following: diallyl phthalate, vinyl acetate, diallyl ether, divinyl ether, allyl crotonate, methyl vinyl ketone, allyl ethers of glycerol, styrene, acrylonitrile, methyl methacrylate, vinyl chloride, vinylidene chloride and allyl acrylate. The copolymers may contain upwards from 5%, preferably from 50% to 95%, of the monomeric phosphinic acid esters of our invention.

The following examples are presented for the purpose of illustrating the invention without the intent of limiting the same.

*Example I*

Methyl benzene(2-propene)phosphinate is prepared in accordance with the invention by refluxing for 48 hours a solution consisting of 0.25 mole of dimethyl benzenephosphonite and 0.50 mole of allyl bromide dissolved in 40 cc. of benzene under conditions allowing the escape of methyl bromide. The phosphinate is isolated by fractionally distilling the reaction products. It has the formula

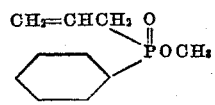

The methyl benzene(2-propene)phosphinate was recovered as a colorless liquid boiling at 107–111° C. under 1–2 mm. mercury pressure. *Analysis.*—Found, carbon 59.7%; hydrogen 6.7%; phosphorus 16.0%. Theory for $C_{10}H_{13}O_2P$, carbon 61.2%; hydrogen 6.6%; phosphorus 15.8%.

*Example II*

Methallyl benzene(2-propene)phosphinate is prepared by refluxing for 48 hours a solution consisting of 0.3 mole of dimethallyl benzenephosphinite and 0.6 mole of allyl bromide dissolved in 80 cc. of benzene under conditions allowing the escape of methallyl bromide. The ester is isolated by fractionally distilling the reaction products. It has the formula

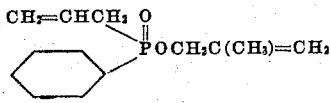

*Analysis.*—Found, carbon 65.2%; hydrogen 7.5%; phosphorus 13.1%. Theory for $C_{13}H_{17}O_2P$, carbon 66.0%; hydrogen 7.2%; phosphorous 13.2%.

*Example III*

Methyl para-toluene(2 - methyl-2-propene)phosphinate is prepared in accordance with the invention by refluxing for 48 hours a solution consisting of 0.25 mole of dimethyl para-toluene-phosphonite and 0.50 mole of methallyl bromide dissolved in 40 cc. of benzene under conditions allowing the escape of methyl bromide. The phosphinate is isolated by fractionally distilling the reaction products. It has the formula

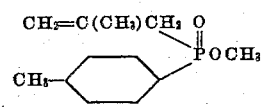

*Example IV*

Butyl benzene(2-propene)phosphinate is prepared by heating together about equimolar amounts of dibutyl benzenephosphinate and allyl bromide and when the reaction has gone to completion fractionally distilling the resulting mixture. Butyl benzene(2-propene)phosphinate has the structural formula

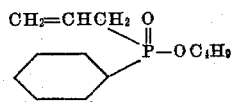

107° C. at 0.1 mm. mercury pressure. Refractive index ($n\,20/D$) 1.5113. *Analysis.*—Found, 12.8% phosphorus. Theory, 13.0% phosphorus.

*Example V*

Decyl 2,3,5 - trimethylbenzene(2-ethyl-2-propene)phosphinate is prepared by heating in a sealed tube a mixture of about 2 moles of 3-chloro-2-ethylpropene and about 1 mole of didecyl 2,3,5-trimethylbenzenephosphinate and fractionally distilling the resulting mixture. The product has the formula

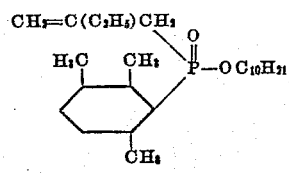

*Example VI*

Butyl 3,5-dibutylbenzene(2-butene)phosphinate is prepared in accordance with the invention by refluxing a mixture of about 2 moles crotyl bromide and about 1 mole dibutyl 3,5-dibutylbenzene-phosphinate for about 48 hours. Butyl bromide is fractionated from the vapors and withdrawn from the system as the reaction progresses. At the end of the reaction period the reaction mixture is fractionally distilled to recover the product.

The formula for butyl 3,5-dibutylbenzene(2-butene)-phosphinate is as follows:

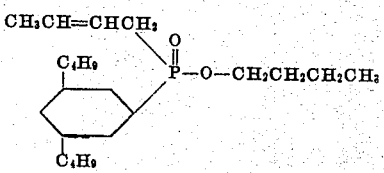

Example VII

Poly[methyl benzene(2-propene)phosphinate] is prepared by heating to a temperature of 115° C. for 24 hours a solution consisting of 10 grams of methyl benzene-(2-propene)phosphinate and 1.0% by weight of di-tertiary-butyl peroxide. The viscous, liquid, thermoplastic polymer is isolated by distilling off the volatile components of the mixed reaction products. It predominates in reoccurring structural units of the formula

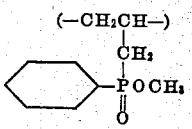

Example VIII

A copolymer of diallyl phthalate with methyl benzene-(2-propene)phosphinate is prepared by heating to a temperature of 115° C. for 24 hours a solution consisting of 8.0 grams of diallyl phthalate, 8.0 grams of methyl benzene(2-propene)phosphinate and 3.5% by weight of di-tertiary-butyl peroxide (based upon the total weight of esters). The polymer is obtained as a slightly plastic, colorless solid.

While various modifications of the present invention have been disclosed, it is to be understood that the invention is not limited thereto, but may be varied within the letter and spirit of the following claims.

We claim as our invention:

1. Methyl benzene(2-propene)phosphinate having the structural formula

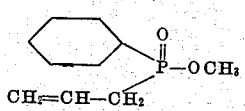

2. A copolymer of diallyl phthalate with an about equal weight of methyl benzene(2-propene)phosphinate having the structural formula

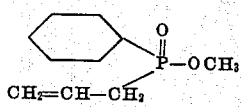

3. Methallyl benzene(2-propene)phosphinate having the structural formula

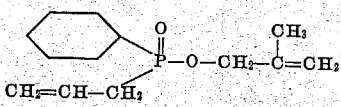

4. Decyl 2,3,5-trimethylbenzene(2-ethyl-2-propene)-phosphinate having the formula

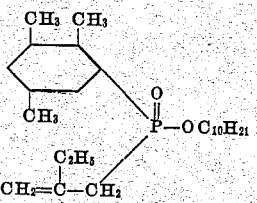

5. Butyl benzene(2-propene)phosphinate having the formula

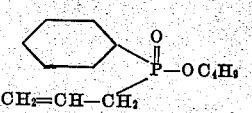

6. Allyl benzene(2-propene)phosphinate having the formula

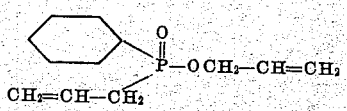

7. A compound having the structure represented by the formula

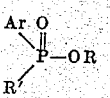

in which Ar represents a member of the class consisting of the phenyl group and the alkyl-substituted phenyl groups, R' represents a lower 2-alkenyl group, and R represents a lower unsubstituted aliphatic hydrocarbon group containing not more than one unsaturated linkage.

8. The polymer of a compound defined in claim 7.

9. A polymer of methyl benzene(2-propene)phosphinate which phosphinate has the structural formula

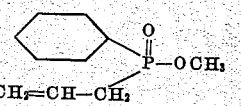

References Cited in the file of this patent

UNITED STATES PATENTS

| | | |
|---|---|---|
| 2,425,765 | Toy | Aug. 19, 1947 |
| 2,425,766 | Toy | Aug. 19, 1947 |
| 2,632,018 | Kosolapoff | Mar. 17, 1953 |